US006576052B1

(12) United States Patent
Takahashi et al.

(10) Patent No.: US 6,576,052 B1
(45) Date of Patent: Jun. 10, 2003

(54) TITANIUM DIOXIDE PIGMENT, PROCESS FOR PRODUCING THE SAME, AND RESIN COMPOSITION CONTAINING THE SAME

(75) Inventors: Hideo Takahashi, Yokkaichi (JP); Masaki Shimojo, Yokkaichi (JP); Toshihiko Akamatsu, Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 0 days.

(21) Appl. No.: 10/070,763

(22) PCT Filed: Sep. 7, 2000

(86) PCT No.: PCT/JP00/06091

§ 371 (c)(1), (2), (4) Date: Mar. 12, 2002

(87) PCT Pub. No.: WO01/19928

PCT Pub. Date: Mar. 22, 2001

(30) Foreign Application Priority Data

Sep. 14, 1999 (JP) .......................................... 11/259910

(51) Int. Cl.[7] ................................................ C09C 1/36

(52) U.S. Cl. ....................... 106/443; 106/426; 106/428; 106/430; 106/431; 106/436; 106/447

(58) Field of Search ................................ 106/426, 428, 106/430, 431, 436, 443, 447

(56) References Cited

U.S. PATENT DOCUMENTS 6,254,992 B1 * 7/2001 Kato .......................... 428/405

FOREIGN PATENT DOCUMENTS

| | | |
|---|---|---|
| EP | 292120 | 11/1988 |
| EP | 713904 | 5/1996 |
| EP | 753546 | 1/1997 |
| JP | 52-109531 | 9/1977 |
| JP | 57-36156 | 2/1982 |
| JP | 60-03430 | 2/1982 |
| JP | 52-21640 | 5/1995 |
| JP | 10-324817 | 12/1998 |
| WO | WO 95/23194 | 8/1995 |

* cited by examiner

*Primary Examiner*—C. Melissa Koslow
*Assistant Examiner*—Shalie Manlove
(74) *Attorney, Agent, or Firm*—Paul E. White, Jr.; Manelli Denison & Selter PLLC

(57) ABSTRACT

The titanium dioxide pigment of the present invention comprises titanium dioxide particles, the coating layer containing the aluminum phosphate compound and the coating layer containing the hydrolyzate of the organosilane compound, on the surface of the particles, in which a difference in water content between 100° C. and 300° C., determined by the Karl Fischer method, is not greater than 1500 ppm, and is thus excellent in light fastness, hydrophobicity and dispersibility. In particular, the titanium dioxide pigment of the invention is extremely advantageous as a colorant for plastics, which requires light fastness (resistance to discoloration) lacing resistance and dispersibility, to a high degree.

17 Claims, No Drawings

TITANIUM DIOXIDE PIGMENT, PROCESS FOR PRODUCING THE SAME, AND RESIN COMPOSITION CONTAINING THE SAME

This application is the national phase of international application PCT/JP00/06091 filed Sep. 7, 2000, which designated the U.S.

TECHNICAL FIELD

The present invention relates to a titanium dioxide pigment having excellent light fastness and excellent hydrophobic and dispersible properties, and a method for production thereof. More particularly, the invention relates to a titanium dioxide pigment suited for use in plastics and a method for production thereof.

BACKGROUND ART

Titanium dioxide pigments are generally poor in light fastness. When titanium dioxide pigments are used in plastics, paints, ink, etc, these pigments thus promote color change, fading or deterioration of organic components such as resin, oil and fats, etc., upon exposure to UV rays. For this reason, titanium dioxide pigments are normally coated with hydrated compounds of aluminum, silicon, zirconium, etc. on the surface of pigment particles thereby to improve light fastness.

Further since titanium dioxide pigments have a hydrophilic nature and when these pigments are incorporated into plastics followed by processing especially into a thin layered film of polyolefin type such as polyethylene or polypropylene, the phenomenon of void formation, which is a so-called lacing problem ascribable to moisture contained in titanium dioxide pigments, occurs to cause deterioration in processing properties such as dispersibility or high packing.

JP, 60-3430, B discloses titanium dioxide pigments having excellent hydrophobicity and dispersibility, which are coated with organosilicons such as silane coupling agents, polysiloxanes, etc., polyhydric alcohols and hydrated oxides of aluminum.

According to this technique, titanium dioxide pigments are imparted hydrophobicity to improve processability, but light fastness is yet insufficient. In order to impart light fastness to titanium dioxide pigments, it is necessary to coat the surface of titanium oxide particles with a sufficient amount of the hydrated oxides of aluminum, silicon, zirconium, etc. Then, the moisture content in titanium dioxide pigments increases to reduce processability. That is, known titanium dioxide pigments could not satisfy light fastness and processing properties (lacing resistance, etc.) at the same time. Furthermore, in order to remove bound water from these hydrated oxides and reduce the moisture content in the resulting anhydrides, heating and firing at high temperatures are required. However, heating and firing at high temperatures result in problems that dispersibility decreases and production costs increase.

DISCLOSURE OF INVENTION

In order to overcome the problems of the prior art described above, the present invention has been made to provide titanium dioxide pigments having excellent light fastness, minimized change in color, highly hydrophobic property and excellent processability including dispersibility, high packing, etc., with less lacing, and to provide a method for producing the same.

The present inventors have made extensive studies to solve these problems. As a result, the inventors have found that by using an aluminum phosphate compound in place of the hydrated oxides of aluminum, silicon or zirconium described above, light fastness of titanium dioxide pigments can be improved even by coating with an aluminum phosphate compound in a small amount, and further by coating with the hydrolyzate of an organosilane compound, titanium dioxide pigments can be rendered hydrophobic to reduce the water content in the resulting titanium dioxide pigments so that titanium dioxide pigments having excellent light fastness and processability for plastics can be obtained. Based on the finding, the present invention has been accomplished.

That is, the present invention is directed to a titanium dioxide pigment comprising titanium dioxide particles, a coating layer containing an aluminum phosphate compound and a coating layer containing the hydrolyzate of an organosilane compound, formed on the surface of the particles, and characterized in that a difference in water content between 100° C. and 300° C. as determined by the Karl Fischer method, is not greater than 1500 ppm. The present invention is also directed to a method for producing the titanium dioxide pigments.

BEST MODE FOR CARRYING OUT THE INVENTION

The titanium dioxide particle that is the substrate of the titanium dioxide pigment of the present invention preferably has an average particle diameter of 0.1 to 0.4 μm determined by electron microscopic photography. The crystal form of the titanium dioxide particle may be anatase structure, rutile structure or mixture of anatase structure and rutile structure. Any method is available for preparing the titanium dioxide particles without any limitation. The titanium dioxide particles may be those obtained by a so-called sulfate process which comprises hydrolyzing a titanium sulfate solution, or by a so-called chloride process which comprises gas phase oxidation of a titanium halide.

The titanium dioxide pigment of the present invention has acquired excellent light fastness by providing the coating layer containing the aluminum phosphate compound.

The aluminum phosphate compound may be any one of aluminum orthophosphate and aluminum metaphosphate. The coating amount of the aluminum phosphate compound ranges preferably from 0.1 to 2.0 wt % in terms of $AlPO_4$ based on titanium dioxide as its substrate. With the amount smaller than the lower limit, the intended light fastness is not obtained and when the amount exceeds the upper limit, the bound water contained in the aluminum phosphate compound causes foaming in plastic molding such as processing of thin layer films, etc., which results in deterioration in lacing resistance.

The titanium dioxide pigment of the present invention has acquired excellent processability, dispersibility and hydrophobicity by further providing the coating layer containing the hydrolyzate of organosilane compound.

The organosilane compound is desirably represented by general formula (1):

$$R_n\text{—Si—}(OR')_{4-n} \quad (1)$$

wherein R is a hydrocarbon group having carbon atoms of not greater than 10 containing at least one of an alkyl, vinyl and methacryl; R' is methyl or ethyl; and n is an integer of 1 to 3, provided that when n is 2 or 3, R may be the same or different hydrocarbon group. When the carbon atom number of the hydrocarbon group R is 11 or larger, not only it is difficult to cause hydrolysis but heat resistance of such a hydrolyzate-coated titanium dioxide pigment becomes poor, titanium dioxide powders become yellow upon drying after the coating treatment and heating during grinding, which leads to yellowing of plastics molded therefrom.

The hydrolyzate referred to in the present invention is used to mean the silanol products obtained via hydrolysis of the alkoxy group in the organosilane compounds shown by the formula above, the oligomers or polymers containing siloxane bonds by further polycondensation between the silanol compounds, and a mixture of at least two compounds selected from these compounds. The hydrolyzate may contain unreacted silane compounds. In view of efficient hydrophobicity, it is particularly preferred that the coating be finally in the form of a polymer. When the coating treatment is performed in aqueous slurry as described below, however, it is preferred to use a hydrophilic silanol monomer as a treating agent added to an aqueous slurry, the hydrophilic silanol monomer is coated on the titanium dioxide then followed by polycondensation.

Specific examples of the organosilane compound described above are methyltriethoxysilane, trimethylethoxysilane, methyltrimethoxysilane, vinyltriethoxysilane, vinylmethyldiethoxysilane, vinyltrimethoxysilane, n-butyltrimethoxysilane, n-butylmethyldimethoxysilane, n-butyltrimethoxysilane, isobutyltriethoxysilane, isobutyltrimethoxysilane, hexyltriethoxysilane, hexylmethyldimethaxysilane, hexyltrimethoxysilane, octyltriethoxysilane, octyltrimethoxysilane, desyltriethoxysilane, desyltriethyoxysilane, methacryloxypropyltriethoxysilane, methacryloxypropyltrimethoxysilane, methacryloxypropylmethyldimethoxysilane, etc.

The amount of the hydrolyzate of the organosilane compound is preferably 0.05 to 3.0 wt %, more preferably 0.2 to 2.0 wt %, when calculated as the organosilane compound, based on the titanium dioxide substrate. When the amount is less than the lower limit, excellent hydrophobicity, dispersibility or lacing resistance are not obtained since the blocking effect of hydroxyl group on the surface of titanium dioxide particles is poor. On the other hand, even with the amount larger than the range above, the effect corresponding to the addition amount of the organosilane compound is not obtained, and such is disadvantageous in an economical aspect.

Either the coating layer containing aluminum phosphate or the coating layer containing the hydrolyzate of the organosilane compound may be formed on the side closer to the titanium dioxide particles. Preferably, the surfaces of titanium dioxide particles are entirely covered by these layers. However, the titanium dioxide pigment of the present invention may contain uncoated titanium dioxide particles, partly coated titanium dioxide particles or titanium dioxide particles covered either by the coating layer containing aluminum phosphate or by the coating layer containing the hydrolyzate of the organosilane compound, within such a range that does not damage the purpose of the invention.

Preferably, the titanium dioxide pigment of the present invention comprises titanium dioxide particles, the coating layer containing aluminum phosphate and the coating layer containing the hydrolyzate of the organosilane compound. However, the titanium dioxide pigment may have a coating layer other than the coating layer containing aluminum phosphate and the coating layer containing the organosilane compound hydrolyzate, e.g., a coating layer containing the hydrated compounds of aluminum, silicon, zirconium, etc. hitherto known within such a range that does not damage the purpose of the invention. Location of these layers is not particularly restricted, either.

The titanium dioxide pigment of the present invention should be that a difference in water content between 100° C. and 300° C., determined by the Karl Fischer method described below, is not greater than 1500 ppm (water content by the Karl Fischer method). When the difference in water content by the Karl Fischer method exceeds the range above, lacing resistance or high packing property becomes poor.

Method for Determining the Water Content by the Karl Fischer Method:

After titanium dioxide was equilibrated by allowing to stand at constant temperature of 25° C. and constant humidity of 55% relative humidity, 1 g of the sample was determined in terms of the water content by the Karl Fischer method at 100° C. and 300° C., using a Karl Fisher device for determining the water content and a water vaporizer attached to the device (both manufactured by Mitsubishi Chemical Corporation) to calculate the difference.

In the present invention, it is preferred to set the dispersibility at 20 kg/cm$^2$ or less. The dispersibility referred to in the present invention is expressed by an increase in resin pressure determined by the following method.

Method for Evaluation of Dispersibility:

Titanium dioxide pigment, 500 g, is blended with 500 g of frozen and ground polyethylene resin (Sumikasen L-750, made by Sumitomo Chemical Co., Ltd.) and 20 g of zinc stearate with a juice mixer for 5 minutes. Using a Labo Plastomill twin screw extruder which is made by Toyo Seiki Seisaku-sho, Ltd. and set to have a resin temperature of 280° C. and a screen of 1450 mesh in the discharge side, the blend is melt-extruded over an hour. Resin pressures are measured at the start of extrusion and an hour after the extrusion, and its difference is made an increased resin pressure.

Furthermore, the present invention is directed to the method for producing the titanium dioxide pigment which comprises the step of preparing an aqueous titanium dioxide slurry containing titanium dioxide particles, the step of forming the coating layer containing the aluminum phosphate compound and the step of forming the coating layer containing the hydrolyzate of the organosilane compound, on the surface of titanium dioxide particles. The steps of forming the coating layer containing the aluminum phosphate compound and forming the coating layer containing the hydrolyzate of the organosilane compound, on the surface of titanium dioxide particles, may be in a reversed order.

The solid content of titanium dioxide in the aqueous slurry is in the range of preferably 50 to 800 g/liter, more preferably 100 to 500 g/liter. With the content higher than the upper limit, the viscosity of the aqueous slurry increases overly to make a uniform coating on the surface of titanium dioxide particles difficult. With the content lower than the range above, operability on an industrial scale becomes poor.

The coating layer containing aluminum phosphate is formed by adding an aqueous solution containing phosphoric acid and aluminum compounds into the titanium dioxide slurry and adjusting pH to 4.5 to 8.0, preferably 4.5 to 7.0, with an aqueous solution of a basic compound. When the pH is higher than 8.0, aluminum oxides are formed in a different phase in which the phosphoric acid compound is not present; in this case, the coating layer of the aluminum phosphate compound contemplated in the present invention is not obtained since the phosphoric acid is not stabilized. When the pH is below 4.5, aluminum phosphate, even if once formed, will be dissolved again. It is advantageous for the coating layer formation to maintain the slurry at a pH of 0 to 4.0 until the pH is adjusted to the range described above. The aluminum phosphate layer can be placed either as a first layer on the surface of titanium dioxide or as a second layer after coating of the hydrolyzate of the organosilane compound, which will be later described. The titanium. dioxide pigment may also be treated in the order of first adding either one of a phosphoric acid compound aqueous solution and an aluminum compound aqueous solution and then adding the organosilane compound to form the coating layer of the hydrolyzate of the organosilane compound, then adding the other, adjusting pH and finally forming the aluminum phosphate coating thereon. Also, the pigment may be treated by previously adding either the phosphoric acid compound aqueous solution or the aluminum compound aqueous solution, next adding the organosilane compound, then adding the other aqueous solution, adjusting pH to form the aluminum phosphate coating layer, and then forming the coating layer of the hydrolyzate of the organosilane compound.

Any phosphoric acid compounds and aluminum compounds may be usable without any particular restriction, so long as these compounds are soluble in water. Examples of the phosphoric acid compound include orthophosphoric acid, metaphosphoric acid, pyrophosphoric acid and salts thereof. Examples of the aluminum compound are sodium aluminate, aluminum sulfate, aluminum nitrate, and the like. For the pH adjustment, there may be employed acidic compounds, e.g., inorganic acids such as sulfuric acid, hydrochloric acid, etc., or organic acids such as acetic acid, formic acid, etc., and inorganic basic compounds such as sodium hydroxide, potassium hydroxide, ammonia, etc.

Preferred amounts of the phosphoric acid compounds and aluminum compounds used are appropriately chosen to form 0.1 to 2.0 wt % of aluminum phosphate calculated as $AlPO_4$, based on titanium dioxide as its basis.

Next, the hydrolyzate of the organosilane compound can be formed, e.g., by any one of (1) a method which comprises adding the organosilane compound to a titanium dioxide aqueous slurry having an acidic pH value adjusted to 0.5 to 6, preferably 2 to 4; and (2) a method which comprises adjusting pH of the aqueous dispersion of the organosilane compound previously prepared to an acidic range of 0.5 to 6, preferably 2 to 4. When the pH is in the range described above, hydrolysis of the organosilane compound proceeds, whereby hydrophilic silanols tend to be formed and hydrophobic polycondensates of silanols are formed only with difficulty. Thus, handling in an aqueous slurry becomes easy and such is preferred. Alternatively, the hydrolyzate may also be formed by preparing silanol monomers, coating the monomers on the titanium dioxide particles, adjusting pH of the slurry to a neutral range or higher, and performing polycondensation to form oligomers or polymers on the surface of the titanium dioxide particles.

JP, 5-221640, A and WO 95/23194 disclose a method which comprises adding an organosilane compound to an alkaline aqueous dispersion of titanium dioxide, which is different from the method of the present invention. However, when the aqueous slurry of titanium dioxide or the aqueous dispersion of an organosilane compound is inclined toward a neutral or alkaline pH region, a rate of the hydrolysis decreases or polycondensation occurs between silanols to make processing in an aqueous slurry difficult. In addition, the reactivity with titanium dioxide is lowered, which leads to failure of sufficient adherence to the surface of titanium dioxide particles to cause such a problem that the desired efficiency is not obtained.

The amount of the organosilane compound employed is appropriately chosen to produce the hydrolyzate in an amount of 0.05 to 3.0 wt %, preferably 0.2 to 2.0 wt %, based on titanium dioxide.

The temperature for the hydrolysis is not particularly limited but preferably ranges from 5 to 40° C. When the temperature is higher than the range above, the organosilane compound, which does not undergo the hydrolysis, tends to readily evaporate or volatilize so that a fixing rate of the hydrolyzate of the organosilane compound onto the surface of titanium dioxide particles becomes low.

The coating of the titanium dioxide particle surface with the hydrolyzate of the organosilane compound can be effected, e.g., by elevating the temperature for the hydrolysis to that for the coating treatment. The temperature for the coating treatment is preferably between 45 and 100° C., more preferably between 60 and 100° C. When the temperature is lower than the range above, it is difficult to perform the coating, and the temperature higher than the range above makes industrial operations under normal pressure difficult.

It is desirable to prepare a dispersion by previously dilute the organosilane compound with a mixture of water and a lower alcohol, or to prepare a slurry of titanium dioxide using a mixed solution of water and a lower alcohol, because the dispersibility of the organosilane compound in the dispersion or slurry is improved.

Examples of the lower alcohol include methyl alcohol, ethyl alcohol, propyl alcohol, isopropyl alcohol, butyl alcohol, etc. The mixing ratio of the lower alcohol can be suitably set forth.

After the steps of coating the aluminum phosphate compound and the hydrolyzate of the organosilane compound are completed, the slurry is filtered, fractionated, dried and subjected to dry grinding to recover the titanium dioxide pigment. By the heat treatment upon drying, polycondensation between the hydrolyzates of the organosilane compound is promoted to reinforce the hydrophobicity. Therefore, the drying temperature is set preferably at 50 to 250° C., more preferably at 100 to 200° C. When the heat treatment is carried out at the temperature higher than the range above, the coated organosilane compound causes an undesirable change in color. Any dry grinding is available from conventional dry grinding including air pulverization, impact pulverization, etc., and has no particular restriction.

The present invention is further directed to a resin composition which comprises formulating the titanium dioxide pigment described above, which is almost free from lacing, pinholes, etc. or poor processability that poorly dispersed particles of the titanium dioxide pigment are projected out of the surface. The resin composition has excellent surface smoothness and glossy surface, and excellent light fastness almost free from change, fading and deterioration in color, etc. under UV rays. A kneader generally available can be used to formulate the titanium dioxide pigment in plastic resin. Examples of the kneader include a twin screw extruder, a Banbury mixer, etc. As plastic resins used in the resin composition of the present invention, there are thermosplastic resins such as polyolefin resin, vinyl chloride resin, polystyrene resin, ABS resin, engineering plastics, etc., thermosetting resins such as phenol resin, urethane resin, unsaturated polyester resin, etc.; various resins can be used without any particular limitation. A proportion of the titanium dioxide pigment in plastic resin is not particularly restricted but the titanium dioxide pigment is preferably formulated in an amount of 0.01 to 900 parts by weight, more preferably 0.1 to 200 parts by weight, based on 100 parts by weight of plastic resin. A variety of additives known to one skilled in the art as additives to resin compositions may be incorporated depending upon use.

EXAMPLES

The invention will be described in more detail by referring to EXAMPLES below. The following EXAMPLES are given merely by way of examples but not deemed to be limited thereto.

Example 1

Using a sand mill, an aqueous slurry of anatase structure titanium dioxide having an average particle size of 0.16 pm was prepared to contain 300 g/liter of titanium dioxide on a weight basis. While maintaining at 30° C., an aqueous mixture solution of orthophosphoric acid and aluminum sulfate was added to the slurry with stirring in an amount of 0.30% calculated as $AlPO_4$, based on the weight of titanium dioxide. After adjusting pH to 3.0 with sulfuric acid, 1.0% of hexyltrimethoxysilane was added to the mixture based on the weight of titanium dioxide and stirring was continued for 2 hours to hydrolyze hexyltrimethoxysilane. While stirring the slurry, the temperature was elevated to 70° C. and stirring was continued at 70° C. for 3 hours to coat titanium dioxide with the hydrolyzate of hexyltrimethoxysilane. Next, the pH of the slurry was adjusted to 5.0 with a sodium hydroxide aqueous solution to precipitate aluminum phosphate and further coat titanium dioxide. Thereafter, titanium dioxide was filtered through a filter press and rinsed. The resulting titanium dioxide cake was dried at 120° C. for 20 hours and ground with a jet mill to give the titanium dioxide pigment of the present invention.

Example 2

The procedures to add hexyltrimethoxysilane and stir were performed as in EXAMPLE 1. The pH of the slurry was adjusted to 5.0 with a sodium hydroxide aqueous solution to precipitate aluminum phosphate and coat titanium dioxide with aluminum phosphate. While heating at 70° C., stirring was then continued for 2 hours to coat titanium dioxide with the hydrolyzate of hexyltrimethoxysilane. Thereafter, filtration, rinsing, drying and grinding were carried out as in EXAMPLE 1 to give the titanium dioxide pigment.

Example 3

The aqueous slurry of anatase structure titanium dioxide used in EXAMPLE 1 was kept at 30° C. While stirring, orthophosphoric acid was added in an amount of 0.13% calculated as $P_2O_5$, based on the weight of titanium dioxide and aluminum sulfate was added in 0.17% as $Al_2O_3$, based on the weight of titanium dioxide. After the pH was adjusted to 3.0 with sulfuric acid, 1% of hexyltrimethoxysilane was added to the slurry based on the weight of titanium dioxide. Stirring was continued for further 2 hours to hydrolyze hexyltrimethoxysilane. While stirring, the slurry was heated to 70° C. and stirred at 70° C. for 4 hours to coat titanium dioxide with the hydrolyzate of hexyltrimethoxysilane. The pH of this slurry was adjusted to 7.0 with a sodium hydroxide aqueous solution to precipitate aluminum phosphate and titanium dioxide was coated with aluminum phosphate followed by filtering through a filter press and rinsing. The resulting cake of titanium dioxide was dried at 120° C. for 20 hours and ground with a jet mill to give the titanium dioxide pigment in accordance with the present invention.

Example 4

The procedures to the steps of adding hexyltrimethoxysilane and stirring were performed as in EXAMPLE 3 to hydrolyze hexyltrimethoxysilane. The pH of the slurry was adjusted to 5.0 with a sodium hydroxide aqueous solution to precipitate aluminum phosphate and titanium dioxide was coated with aluminum phosphate. While heating at 70° C., stirring was continued for 2 hours, and titanium dioxide was coated with the hydrolyzate of hexyltrimethoxysilane. Thereafter, filtration, rinsing, drying and grinding were performed as in EXAMPLE 3 to give the titanium dioxide pigment.

Example 5

The aqueous slurry of anatase structure titanium dioxide used in EXAMPLE 1 was kept at 30° C. While stirring, orthophosphoric acid was added in an amount of 0.13% calculated as $P_2O_5$, based on the weight of titanium dioxide. After the pH was adjusted to 3.0 with sulfuric acid, 1% of hexyltrimethoxysilane was added to the slurry based on the weight of titanium dioxide. Stirring was continued for further 2 hours to hydrolyze hexyltrimethoxysilane. While stirring, the slurry was heated to 70° C. and stirred at 70° C. for 3 hours to coat titanium dioxide with the hydrolyzate of hexyltrimethoxysilane. After sodium aluminate was added in 0.17% as $Al_2O_3$, based on the weight of titanium dioxide, the pH was adjusted to 7.0 with a sodium hydroxide aqueous solution to precipitate aluminum phosphate and titanium dioxide was coated with aluminum phosphate. The slurry was filtered through a filter press and rinsed. The resulting cake of titanium dioxide was dried at 120° C. for 20 hours and ground with a jet mill to give the titanium dioxide pigment in accordance with the present invention.

Example 6

The procedures to the steps of adding hexyltrimethoxysilane and stirring were performed as in EXAMPLE 5.

After sodium aluminate was added in 0.17% as $Al_2O_3$, based on the weight of titanium dioxide, the pH was adjusted to 5.0 with a sodium hydroxide aqueous solution to precipitate aluminum phosphate and titanium dioxide was coated with aluminum phosphate. While stirring at 70° C. for 4 hours to coat titanium dioxide with the hydrolyzate of hexyltrimethoxysilane. Thereafter, filtration, rinsing, drying and grinding were performed as in EXAMPLE 5 to give the titanium dioxide pigment.

By analyzing Al and P in the titanium dioxide pigments obtained in EXAMPLES 1 through 6, the coverage of aluminum phosphate was found to be 0.30 wt % calculated as $AlPO_4$ in all samples. Similarly, the Si content was analyzed so that the coverage of the hydrolyzate of the organosilane compound was found to be 0.8 wt % in all samples, when calculated as the organosilane compound.

Comparative Example 1

The aqueous slurry of anatase structure titanium dioxide used in EXAMPLE 1 was kept at 30° C. While stirring, sulfuric acid was added to adjust pH to 3.0. Then, hexyltrimethoxysilane was added to the slurry in an amount of 1%, based on the weight of titanium dioxide. Stirring was continued for further 2 hours to hydrolyze hexyltrimethoxysilane. While stirring, the slurry was heated to 70° C. and further stirred at 70° C. for 3 hours to coat titanium dioxide with the hydrolyzate of hexyltrimethoxysilane. To the slurry, sodium aluminate was added in 0.30% as $Al_2O_3$, based on the weight of titanium dioxide. After the pH was adjusted to 7.0 with a sodium hydroxide aqueous solution to precipitate the hydrated oxide of aluminum and coat titanium dioxide. By filtering through a filter press and rinsing, the resulting cake of titanium dioxide was dried at 120° C. for 10 hours and ground with a jet mill to give the titanium dioxide pigment coated with the silane compound and the hydrated oxide of aluminum.

Comparative Example 2

The procedures were performed as in COMPARATIVE EXAMPLE 1, except that sodium silicate was used in lieu of sodium aluminate. The titanium dioxide pigment coated with the silane compound and the hydrated oxide of silica was obtained.

Comparative Example 3

The procedures were performed as in COMPARATIVE EXAMPLE 1, except that zirconium sulfate was used in lieu of sodium aluminate. The titanium dioxide pigment coated with the silane compound and the hydrated oxide of zirconium was obtained.

Comparative Example 4

The titanium dioxide pigment was obtained as in COMPARATIVE EXAMPLE 1, except that sodium aluminate was not added.

The measurement results of the samples obtained in EXAMPLES 1 to 6 and COMPARATIVE EXAMPLES 1 to 4 are shown in TABLE 1. These measurement results were determined by the following procedures.

(1) Water Content

The water content was determined by the Karl Fischer method described above.

(2) Dispersibility

The dispersibility was evaluated by the method for evaluation of dispersibility described above, in terms of an increase in resin pressure.

(3) Lacing Resistance

In testing the dispersibility described above, a strand die was mounted in Labo Plastomill at the discharge side and the molten matter released from the strand was visually observed to evaluate the state of voids. The criterion for the evaluation is as follows.

◎: Any void is not observed at all.

○: Voids are slightly observed.

Δ: Voids are partly observed.

X: Voids are entirely observed.

(4) Light Fastness

Using 2 rolls 10 g of a sample, 40 g of polyethylene resin (Sumikasen L-705, made by Sumitomo Chemical Co., Ltd.) and 0.4 g of zinc stearate were kneaded at 140° C. for 5 minutes and molded at 180° C. under pressure to make a sheet (6×6 cm) having a thickness of 1 mm.

This sheet was exposed to a fade meter (made by SUGA TEST INSTRUMENTS Co., Ltd.) for 5 hours and evaluated by a color difference meter (made by SUGA TEST INSTRUMENTS Co., Ltd.) in terms of Hunter color indication (L, a, b) to calculate a degree of discoloration [ΔE={(ΔL)2+(Δa)2+(Δb)2}1/2] for assessment of light fastness.

The results evaluated by (1) to (4) are shown in TABLE 1.

TABLE 1

| | Water content (ppm) | | Dispersibility | Lacing | Light Fastness (degree of discoloration after exposure for 5 hrs.) | | |
|---|---|---|---|---|---|---|---|
| | 100° C. | 300° C. | ($kg/cm^2$) | Resistance | ΔL | Δb | ΔE |
| EXAMPLE 1 | 1306 | 2600 | 5↓ | ○ | −0.6 | +0.3 | 0.8 |
| EXAMPLE 2 | 1200 | 2500 | 5↓ | ○ | −0.5 | +0.3 | 0.7 |
| EXAMPLE 3 | 1300 | 2600 | 5↓ | ○ | −0.6 | +0.3 | 0.8 |
| EXAMPLE 4 | 1200 | 2500 | 5↓ | ○ | −0.5 | +0.3 | 0.7 |
| EXAMPLE 5 | 1400 | 2700 | 5↓ | ○ | −0.6 | +0.3 | 0.8 |
| EXAMPLE 6 | 1300 | 2600 | 5↓ | ○ | −0.6 | +0.3 | 0.8 |
| COMP. EX. 1 | 1500 | 3100 | 5↓ | Δ | −0.7 | +0.8 | 1.0 |
| COMP. EX. 2 | 1700 | 3400 | 5↓ | X | −1.1 | +1.3 | 1.6 |
| COMP. EX. 3 | 1200 | 2800 | 5↓ | Δ | −1.0 | +1.1 | 1.2 |
| COMP. EX. 4 | 1100 | 2100 | 5↓ | ◎ | −1.2 | +1.4 | 1.9 |

INDUSTRIAL APPLICABILITY

The titanium dioxide pigment of the present invention comprises titanium dioxide particles, the coating layer containing the aluminum phosphate compound and the coating layer containing the hydrolyzate of the organosilane compound, on the surface of the particles, in which a difference in water content between 100° C. and 300° C., determined by the Karl Fischer method, is not greater than 1500 ppm, and is thus excellent in light fastness, hydrophobicity and dispersibility. In particular, the titanium dioxide pigment of the invention is extremely advantageous as a colorant for plastics, which requires light fastness (resistance to discoloration) lacing resistance and dispersibility, to a high degree.

What is claimed is:

1. A titanium dioxide pigment comprising titanium dioxide particles, a coating layer containing an aluminum phosphate compound and a coating layer containing the hydrolyzate of an organosilane compound, on the surface of said particles, in which a difference in water content between 100° C. and 300° C., determined by the Karl Fischer method, is not greater than 1500 ppm.

2. The titanium dioxide pigment according to claim 1, wherein said organosilane compound is represented by general formula (1):

$$R_n\text{—Si—}(OR')_{4-n} \quad (1)$$

wherein R is a hydrocarbon group having carbon atoms of not greater than 10 containing at least one of an alkyl, vinyl and methacryl; R' is methyl or ethyl; and n is an integer of 1 to 3, provided that when n is 2 or 3, R may be the same or different hydrocarbon group.

3. The titanium dioxide pigment according to claim 1, wherein the amount of said aluminum phosphate compound ranges from 0.1 to 2.0 wt % in terms of $AlPO_4$ based on the titanium dioxide particles.

4. The titanium dioxide pigment according to claim 1, wherein the amount of said hydrolyzate of the organosilane compound is 0.05 to 3.0 wt % calculated as the organosilane compound, based on the titanium dioxide particles.

5. The titanium dioxide pigment according to claim 1, wherein dispersibility is not greater than 20 $kg/cm^2$.

6. A method for producing a titanium dioxide pigment which comprises:

the step of preparing an aqueous slurry of titanium dioxide containing titanium dioxide particles;

the step of forming a coating layer containing an aluminum phosphate compound and the step of forming a coating layer containing the hydrolyzate of an organosilane compound, on the surface of the titanium dioxide particles.

7. The method according to claim 6, wherein the step of forming the coating layer containing the hydrolyzate of the organosilane compound is performed between 40 and 100° C.

8. The method according to claim 6, which further includes the step of drying at 50 to 250° C.

9. The method according to claim 6, wherein the step of forming the coating layer containing the hydrolyzate of the organosilane compound involves the step of preparing the hydrolyzate of the organosilane compound and the step of forming the coating layer containing said hydrolyzate, and said hydrolyzate is prepared by adding the organosilane compound to the aqueous slurry of titanium dioxide rendered acidic.

10. The method according to claim 6, wherein the step of forming the coating layer containing the hydrolyzate of the organosilane compound involves the step of preparing the hydrolyzate of the organosilane compound and the step of forming the coating layer containing said hydrolyzate, and said hydrolyzate is prepared by rendering an aqueous dispersion of the organosilane compound acidic.

11. The method according to claim 9, wherein pH of the aqueous slurry of titanium dioxide is adjusted to 0.5 to 6.

12. The method according to claim 10, wherein pH of the aqueous dispersion of the organosilane compound is adjusted to 0.5 to 6.

13. The method according to claim 9, wherein, said hydrolyzate of the organosilane compound is prepared between 5 to 40° C.

14. The method according to claim 9, wherein the aqueous slurry of titanium dioxide contains titanium dioxide, water and a lower alcohol.

15. The method according to claim 10, wherein the aqueous dispersion of the organosilane compound contains an organosilane, water and a lower alcohol.

16. A resin composition comprising the titanium dioxide pigment according to claim 1 and a plastic resin.

17. The method according to claim 10, wherein, said hydrolyzate of the organosilane compound is prepared between 5 to 40° C.

* * * * *